United States Patent [19]

Toda et al.

[11] 4,062,334
[45] Dec. 13, 1977

[54] FUEL SYSTEM OF INTERNAL COMBUSTION ENGINE

[75] Inventors: Tadahide Toda; Toshiaki Konomi, both of Susono, Japan

[73] Assignee: Toyota Jidosha Kogyo Kabushiki Kaisha, Toyota, Japan

[21] Appl. No.: 481,505

[22] Filed: June 21, 1974

[30] Foreign Application Priority Data

July 20, 1973 Japan .................. 48-80674

[51] Int. Cl.² .......................................... F02M 31/00
[52] U.S. Cl. ...................... 123/122 AB; 123/52 M; 123/52 MV; 123/127; 261/23 A
[58] Field of Search .......... 123/127, 122 AB, 52 MV, 123/52 M; 261/41 C, 23 A

[56] References Cited

U.S. PATENT DOCUMENTS

| | | | |
|---|---|---|---|
| 2,430,693 | 11/1947 | Udole | 261/23 A |
| 2,460,046 | 1/1949 | Vincent | 123/127 |
| 2,647,502 | 8/1953 | Braun | 123/127 |
| 2,737,375 | 3/1956 | Kittler | 261/239 A |
| 2,768,818 | 10/1956 | Egererer | 261/23 A |
| 2,798,703 | 7/1957 | Carlson | 261/23 A |
| 3,003,488 | 10/1961 | Carlson | 123/127 |
| 3,021,827 | 2/1962 | Brunner | 123/127 |
| 3,310,045 | 3/1967 | Bartholemew | 123/52 MV |
| 3,845,746 | 11/1974 | Elsbett | 123/52 M |

*Primary Examiner*—Ronald H. Lazarus
*Attorney, Agent, or Firm*—Blanchard, Flynn, Thiel, Boutell & Tanis

[57] ABSTRACT

A fuel system for an internal combustion engine comprises a pair of carburetors provided one each on the exhaust and intake side of the engine. The fuel-air mixture from the first carburetor is heated by exhaust gas before being introduced into an intake manifold through a passage within a cylinder head. Throttle valves are associated with the respective carburetors and are controlled in an interlocked manner so as to open the throttle valve associated with the first carburetor while maintaining the other throttle valve closed during a partial load operation, and to open the throttle valve associated with the second carburetor to supply the air enriched mixture to the cylinders while closing the first mentioned throttle valve during a full load operation. Alternatively, a combined use of supply from the first and second carburetors concurrently may be chosen.

4 Claims, 6 Drawing Figures

FUEL SYSTEM OF INTERNAL COMBUSTION ENGINE

FIELD OF THE INVENTION

The invention relates to an improved fuel distribution system which enhances the warming-up characteristics of an internal combustion engine.

BACKGROUND OF THE INVENTION

It is known to locate a body catalyst within an exhaust pipe in order to clean the exhaust gas. However, it is found that more than 80% of CO, HC will be exhausted within a very short period of time before the engine and catalyst are warmed up. This resulted in a trend to develop means for rapidly heating the manifold within a limited time interval after the engine has been started.

On the other hand, there has been a proposal to improve the fuel distribution by providing a pre-mix chamber or an extension tube between the carburetor and the intake manifold, and heating the chamber or the tube from its surrounding. However, difficulties are experienced in mounting such a pre-mix chamber or extension tube on a vehicle and in heating it from the surrounding.

In a counterflow engine, a development is also in progress to provide a rapid heating of the manifold by the heat from the exhaust gas in order to improve the warming-up characteristic and reduce deleterious exhaust gas components. In a crossflow engine, the heating of the manifold takes place by utilizing the engine cooling water, but water has a relatively large specific heat, which renders a rapid heating impossible. To accommodate for such shortcoming, there have been various proposals including distributing the exhaust gas from the exhaust side to the intake side by way of a piping or feeding the exhaust gas to the intake side through a passage within the cylinder head. In either arrangement, it is found that the exhaust gas becomes cold intermediate its passage through the piping, resulting in a failure to provide a sufficient heating. In addition, the exhaust gas which was intended to provide heating retarded the warming-up of the catalytic converter and of the manifold reactor, thus degrading the exhaust gas cleaning performance. Additionally, when the temperature of the heated portion of the manifold rises, though the fuel distribution and combustion are improved, the intake air is subjected to an expansion to reduce the mass of the intake air, thus disadvantageously reducing the full output of the engine.

SUMMARY OF THE INVENTION

The invention overcomes the above difficulties and disadvantages by providing, in a preferred embodiment, a pair of carburetors one each on the intake and exhaust sides of a crossflow engine. The heating of the intake pipe takes place on the exhaust side by way of the exhaust gas, while the heating of the intake minfold is not effected. In a partial load region, fuel-air mixture is supplied from the carburetor provided on the exhaust side, and in a full load region where the output obtained is of primary concern, the supply is switched to the carburetor provided on the intake side. Whenever it is desired to increase the quantity of the intake air, the supply from both carburetors is used in combination.

DETAILED DESCRIPTION

Figure 1:
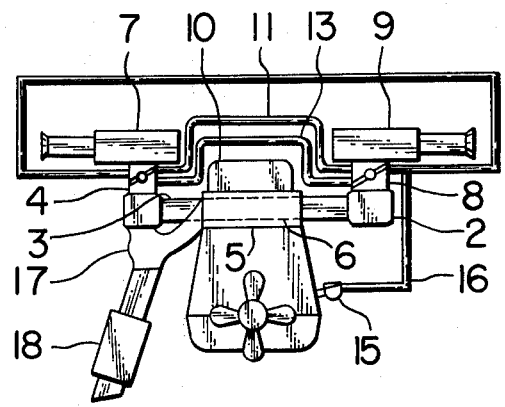
FIG. 1 is a schematic front view of the engine according to the invention.
Figure 2:
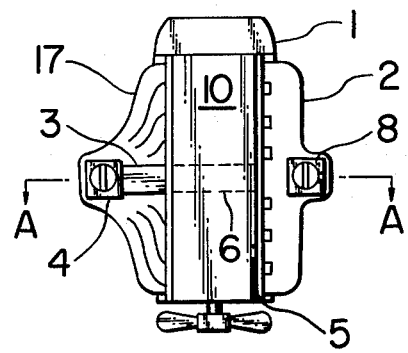
FIG. 2 is a plan view of the engine.
Figure 3:
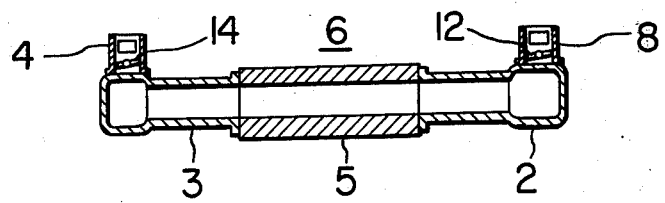
FIG. 3 is a fragmentary cross-section taken along the line A—A shown in FIG. 2.

Referring to FIGS. 1 to 3, an engine body is shown at 1 and is associated with an intake manifold 2 which is connected through an intake pipe 3 with a first carburetor 4 provided on the exhaust side of the engine for receiving a fuel-air mixture therefrom, the intake pipe 3 extending through a passage 6 within a cylinder head 5. The carburetor 4 is associated with a first air cleaner 7. A second carburetor 8 is provided on the intake side and includes a second air cleaner 9. The engine body is closed by a cylinder head cover 10. A control rod 11 is provided to control the opening and closing of a throttle valve 12 associated with the second carburetor 8, and similarly a control rod 13 is provided to control the opening and closing of a throttle valve 14 associated with the first carburetor 4. A fuel pump is shown at 15 and is connected with a conduit 16 for supplying fuel to the first and second carburetors 4 and 8. An exhaust manifold 17 is arranged to cover part of the intake pipe 3 so that the fuel-air mixture within the intake pipe 3 may be heated by the exhaust gas which passes through the exhaust manifold 17.

For a partial load operation, the fuel-air mixture from the first carburetor 4 is heated within the intake pipe 3 by the exhaust gas passing through the exhaust manifold 17 before being fed through the passage 6 and intake manifold 2 into a cylinder. For a full load operation, the throttle valve control rods 11 and 13, which are interlocked with each other, are operated so as to close the throttle valve 14 associated with the first carburetor 4 and to open the throttle valve 12 associated with the second carburetor 8 which is adapted to supply an air enriched mixture, thereby allowing the fuel-air mixture from the second carburetor 8 to be supplied through the intake manifold 2 into a cylinder to thereby increase the engine output.

Figure 4:
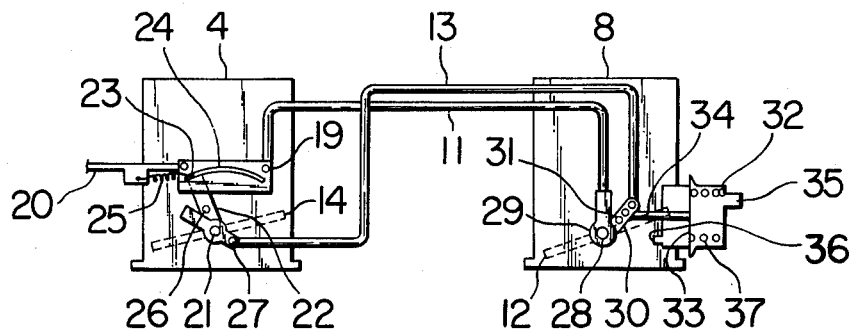
FIG. 4 is a schematic view of a mechanism for operating throttle valves used in the engine of FIG. 1.

Referring to FIG. 4, the operation of switching the supply of the fuel-air mixture between the partial load and full load operations or between the first and second carburetors 4 and 8 will be more specifically described below. The control rod 11 has its one end connected with a link plate 19 located adjacent to the first carburetor 4. The link plate 19 is adapted to be moved to the left or right, as viewed in FIG. 4, by means of an operating rod 20, which rod 20 is actuated in a conventional manner by the accelerator petal of the vehicle. The throttle valve 14 of the first carburetor 4 has a pivot 21 on which is secured one end of throttle valve operating lever 22 carrying at its other end a pin 23 which in turn engages an arcuate groove 24 formed in the link plate 19. The pin 23 is connected with the operating rod 20 by means of a spring 25. Fixedly mounted on the lever 22 is an operating pin 26 which is adapted to be urged by a throttle valve control lever 27 as it rotates, the control lever 27 being loosely fitted on the pivot 21 of the throttle valve. The control rod 11 has its other end connected with one end of a lever 29 which is loosely fitted on a pivot 28 of the throttle valve 12 associated with the second carburetor 8. A throttle valve operating lever 30 is fixedly mounted on the pivot 28 and has its one end connected with one end of the control rod 13 and has its other end connected with one end of the throttle valve control lever 27 associated with the first carburetor 4. Pivotally mounted on the control lever 30 is a stop pin 31 which is adapted to be abutted by the lever 29. Lever 30 also abuts a stem 34 of a diaphragm valve 33 located within a diaphragm chamber 32. The diaphragm chamber 32 is divided by the diaphragm valve 33 into a first section having a port 35 for introducing the negative pressure prevailing in the manifold and a second section having a port 36 which communicates with the atmosphere. A spring 37 is disposed within the first section of the diaphragm chamber to urge the diaphragm valve 33 toward the second section, and the stem 34 is connected with the diaphragm valve 33 on the side facing the second section.

When the engine is to operate under a partial load, the operating rod 20 is pulled to the left, as viewed in FIG. 4, whereby the link plate 19 is also pulled to the left, causing the lever 29 to rotate counter-clockwise about the pivot 28 through the control rod 11. Because the lever 29 is loosely fitted on the pivot 28, the latter does not rotate with the lever 29. Simultaneously, the throttle valve operating lever 22 of the first carburetor 4 rotates counter-clockwise under the resilience of the spring 25, thereby opening the throttle valve 14.

When the negative pressure prevailing in the manifold is high, the diaphragm valve 33 and its stem 34 will be pulled to the right against the resilience of the spring 37. As the full load is approached, the negative pressure prevailing in the manifold decreases to permit the resilience of the spring 37 to cause the diaphragm valve 33 and its stem 34 to move to the left, whereby the throttle valve operating lever 30 rotates counter-clockwise together with the pivot 28 on which it is secured, thereby opening the throttle valve 12. The lever 30 comes to a stop when the stop pin 31 thereon abuts against the control lever 29. Thus, the angle through which the lever 30 rotates is determined by the amount of the leftward movement of the operating rod 20. As the lever 30 rotates counterclockwise, the control rod 13 causes the throttle valve control lever 27 of the first carburetor 4 to rotate clockwise until it abuts against the operating pin 26, whereafter the throttle valve operating lever 22 is urged by the lever 27 to rotate clockwise against the resilience of the spring 25 while the pin 23 moves through the arcuate groove 24, thus closing the throttle valve 14. As a result, the intake of the fuel-air mixture from the first carburetor 4 is interrupted, and the intake of the air enriched fuel-air mixture from the second carburetor 8 is commenced, thus preventing a reduction in the output under the full load operation.

Figure 5:
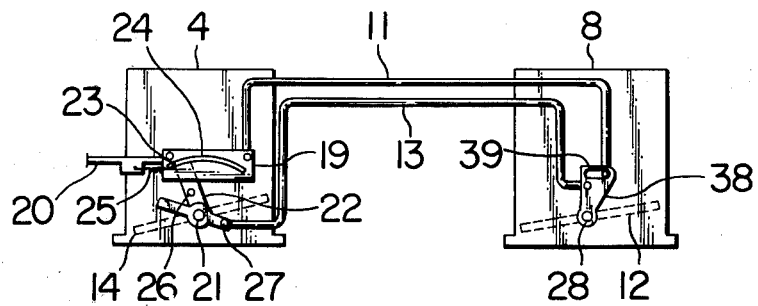
FIGS. 5 and 6 show other embodiments of the mechanism shown in FIG. 4.

FIG. 5 shows another embodiment of the mechanism similar to that shown in FIG. 4, but in which the diaphragm chamber is eliminated. Similar parts are designated by like numerals in this figure as in FIG. 4. When the control rod 11 is pulled to the left, its other end slides within an elongate groove 39 formed in a lever plate 38 which is secured to the pivot 28 of the throttle valve 12 associated with the second carburetor 8, and upon abutment against the left-hand end of the elongate groove, it causes the lever plate 38 to rotate counter-clockwise, whereby the throttle valve 12 is opened. At the same time, the control rod 13 which is connected with the lever plate 38 causes the throttle valve control lever 27 associated with the first carburetor 4 to rotate clockwise and subsequently causes the throttle valve operating lever 22 to rotate clockwise against the resilience of the spring 25, thereby closing the throttle valve 14.

Figure 6:
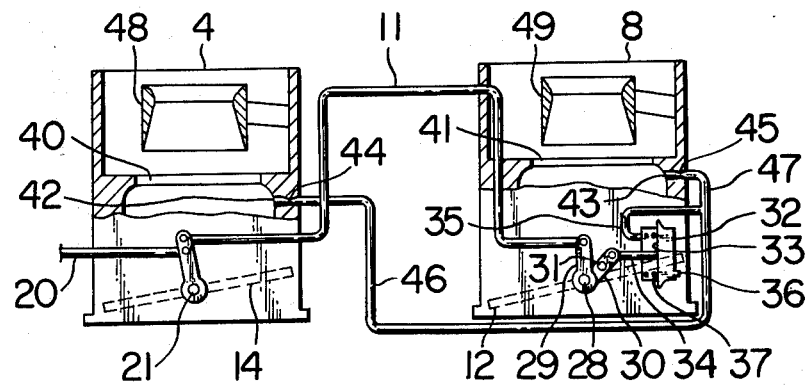

FIG. 6 shows a further embodiment of the invention which permits the use of the first carburetor 4 alone when the quantity of intake air is limited and which permits a combined use of the first and second carburetors 4 and 8 when a large supply of air is available. In this figure, similar parts are designated by like numerals as used before. When the operating rod 20 is pulled to the left, the operating lever 22 for the throttle valve 14 of the first carburetor 4 rotates counter-clockwise to open this throttle valve, while the control rod 11 causes a counter-clockwise rotation of the lever 29 which is loosely fitted on the pivot 28 of the throttle valve 12 associated with the second carburetor 8. Restricted ports 40 and 41 are formed in the respective carburetors, and the air passing through the ports produces a negative pressure having a magnitude which is proportional to the square of the amount of air. Such negative pressure is applied through inlet ports 42, 43, through restrictions 44, 45 and through conduits 46, 47 to be supplied simultaneously into the diaphragm chamber 32 by way of the port 35 which functions to introduce the negative pressure. Because the diaphragm stem 34 is located on the negative pressure side of the diaphragm chamber 32, it will be appreciated that as the amount of intake air increases, the negative pressure increases to cause a movement of the stem 34 to the left, causing a counter-clockwise rotation of throttle valve operating lever 30 to open the throttle valve 12. The lever 30 comes to a stop at a position where the stop pin 31 thereon abuts against the lever 29. Numerals 48 and 49 represent venturis within the carburetors.

From the foregoing description, it will be appreciated that the intake into the respective cylinders through an intake passage within the cylinder head in accordance with the invention results in an improved carburetion and mixing of the fuel-air mixture, which becomes homogeneous to improve the combustion process, and also results in an improved fuel distribution and exhaust recirculation, effectively reducing $NO_x$ and enabling the adverse influence of the exhaust recirculation upon the combustion process to be minimized. The provision of the carburetor on the exhaust manifold of the crossflow engine to permit a portion of the intake pipe to be heated by the exhaust gas improves the warming-up performance with resulting reduction in CO and HC emission, and increases the heating temperature, thereby improving the carburetion of the fuel-air mixture and the fuel distribution. The full output performance can be improved by providing a pair of carburetors which are switched between the patial load and full load operations to provide a selective supply of the fuel-air mixture. As compared against a counter-flow engine, the only addition required is to mount a carburetor and a small intake pipe on the exhaust side, which in no way hinders the mounting of a manifold reactor.

The embodiments of the invention in which an exclusive property or privilege is claimed are defined as follows:

1. In an internal combustion engine having a housing which includes a cylinder head, an exhaust manifold positioned adjacent one side of the engine housing, and an intake manifold spaced from said exhaust manifold and positioned adjacent the other side of said engine housing, comprising the improvement wherein a first carburetor is provided on one side of the engine directly adjacent the exhaust manifold, an intake passage connected between the outlet of said first carburetor and said intake manifold, said intake passage having a first part thereof disposed on said one side of the engine and at least partially covered by said exhaust manifold to create a hot spot so that the fuel-air mixture from the first carburetor is heated by the waste heat from the exhaust gases in the exhaust manifold, said intake passage also having a second part extending between said first part and said intake manifold, said second part being disposed within and extending across said cylinder head for permitting additional heating of the fuel-air mixture from the first carburetor by the waste heat from the cylinder head prior to said mixture being introduced into the intake manifold, a second carburetor provided on the other side of the engine in widely spaced relationship from both said first carburetor and said exhaust manifold, said second carburetor being positioned directly adjacent and having the discharge thereof connected to the intake manifold for supplying a cool fuel-air mixture thereto, and control means for interlocked operation of the throttle valves associated with the first and second carburetors, said control means being operable only subsequent to the opening of the throttle valve associated with the first carburetor.

2. An engine according to claim 1, wherein said control means includes a lost-motion linkage connected between the throttle valves of said first and second carburetors for permitting opening movement of said throttle valve of said first carburetor without causing any opening movement of said throttle valve of said second carburetor.

3. An engine according to claim 2, wherein said control means includes means associated therewith for returning said first throttle valve to its closed position upon the opening of said second throttle valve.

4. An engine according to claim 1, wherein said control means includes fluid pressure means for moving the throttle valve of the second carburetor into an open position subsequent to the opening of the throttle valve of the first carburetor, said fluid pressure means being responsive to the pressure within one of the flow passages through said carburetors.

* * * * *